United States Patent
Hagelin

(10) Patent No.: US 10,242,259 B2
(45) Date of Patent: Mar. 26, 2019

(54) METHODS, A SYSTEM AND AN ANALYZE SERVER FOR VERIFYING AN AUTHENTICITY OF AN IDENTITY DOCUMENT AND EXTRACTING TEXTUAL INFORMATION THEREFROM

(71) Applicant: 365id AB, Halmstad (SE)

(72) Inventor: Johan Hagelin, Halmstad (SE)

(73) Assignee: 365id AB, Halmstad (SE)

( * ) Notice: Subject to any disclaimer, the term of this patent is extended or adjusted under 35 U.S.C. 154(b) by 154 days.

(21) Appl. No.: 15/275,167

(22) Filed: Sep. 23, 2016

(65) Prior Publication Data
US 2017/0147876 A1 May 25, 2017

(30) Foreign Application Priority Data

Nov. 23, 2015 (SE) ...................................... 1551523

(51) Int. Cl.
*G06K 9/00* (2006.01)
*G06K 9/20* (2006.01)
(Continued)

(52) U.S. Cl.
CPC ..... *G06K 9/00456* (2013.01); *G06K 9/00483* (2013.01); *G06K 9/2018* (2013.01);
(Continued)

(58) Field of Classification Search
CPC ............ G06Q 20/4014; G06Q 20/206; G06K 9/00442; G06K 9/00483; G06K 9/00456;
(Continued)

(56) References Cited

U.S. PATENT DOCUMENTS 6,269,169 B1 * 7/2001 Funk .................. G07C 9/00071
283/72
7,911,655 B2 3/2011 Hatzav et al.
(Continued)

FOREIGN PATENT DOCUMENTS

CA 2 883 010 A1 8/2015
DE 10 2011 082028 3/2013
(Continued)

OTHER PUBLICATIONS

Kuklinski, Theodore, and Bruce Monk. "The Use of ID Reader-Authenticators in Secure Access Control and Credentialing." Technologies for Homeland Security, 2008 IEEE Conference on. IEEE, 2008.*
(Continued)

*Primary Examiner* — Geoffrey E Summers
(74) *Attorney, Agent, or Firm* — Knobbe Martens Olson & Bear LLP

(57) ABSTRACT

The present disclosure relates to methods, a system and an analyze server for verifying the authenticity of identity documents and extracting textual information therefrom. The presence of the identity document in a slot of a scanner is detected and three different images of the identity document are acquired when the identity document is illuminated with white light, UV light and IR light, respectively. The images are encrypted and sent to an analyze server which determines the authenticity of the identity and extracts textual information. The analyze server generates an encrypted verification report including textual information extracted from the identity document and sends it to the scanner, which in turn sends a first signal to an indicating device for indicating the state of the authenticity of the identity document and the textual information to a Point of
(Continued)

Sale (POS) system in response to verifying the identity document.

18 Claims, 6 Drawing Sheets

(51) Int. Cl.
*G07D 7/12* (2016.01)
*G07F 7/12* (2006.01)
*G06Q 20/20* (2012.01)
*G06Q 20/40* (2012.01)
*H04L 29/06* (2006.01)
*H04N 5/33* (2006.01)

(52) U.S. Cl.
CPC ....... *G06Q 20/206* (2013.01); *G06Q 20/4014* (2013.01); *G07D 7/12* (2013.01); *G07F 7/12* (2013.01); *H04L 63/0428* (2013.01); *H04N 5/332* (2013.01); *G06K 2209/01* (2013.01); *G06K 2209/27* (2013.01)

(58) Field of Classification Search
CPC ............ G06K 9/2018; G06K 2209/27; G06K 2209/01; H04L 63/0428; H04N 5/332; G07F 7/12; G07D 7/12; G07D 7/121; G06F 7/12
USPC ........................................................ 382/115
See application file for complete search history.

(56) References Cited

U.S. PATENT DOCUMENTS

| | | | |
|---|---|---|---|
| 2003/0169415 | A1 | 9/2003 | Premjeyanth et al. |
| 2006/0018508 | A1* | 1/2006 | Monk ................ G03H 1/2286 382/100 |
| 2006/0072822 | A1* | 4/2006 | Hatzav ................ G03B 15/00 382/181 |
| 2006/0157559 | A1* | 7/2006 | Levy ...................... G06K 17/00 235/380 |
| 2012/0075442 | A1* | 3/2012 | Vujic ................. G07C 9/00087 348/61 |
| 2012/0226600 | A1* | 9/2012 | Dolev ................. G06K 9/6203 705/38 |
| 2014/0212041 | A1 | 7/2014 | Komarov et al. |
| 2015/0002915 | A1* | 1/2015 | Lebaschi ................. H04N 1/56 358/538 |
| 2015/0036891 | A1* | 2/2015 | Takenouchi ........... G07D 7/121 382/112 |
| 2015/0063655 | A1* | 3/2015 | Poder ...................... G06T 1/005 382/116 |
| 2015/0089615 | A1 | 3/2015 | Krawczyk et al. |
| 2015/0341370 | A1* | 11/2015 | Khan ...................... H04L 63/20 726/30 |

FOREIGN PATENT DOCUMENTS

| | | |
|---|---|---|
| WO | WO 0004516 A1 | 1/2000 |
| WO | WO 03/036419 A2 | 5/2003 |

OTHER PUBLICATIONS

Smith, Rick. "Understanding encryption and cryptography basics." SearchSecurity.com, Jan. 8, 2003.*
Lord, Nate. "What is Data Encryption?" Digital Guardian, Feb. 23, 2015.*
Shapiro, Linda and George Stockman. Computer Vision. Prentice Hall, 2001.*
Extended European Search Report in European Application No. 16190282.0 dated Nov. 7, 2016.
International Search Report in International Application No. PCT/SE2016/050895 dated Dec. 9, 2016.
International Search Report in International Application No. PCT/SE2016/050896 dated Dec. 9, 2016.
European Search Report dated Feb. 1, 2018, in Application No. EP 16190282.0.

* cited by examiner

METHODS, A SYSTEM AND AN ANALYZE SERVER FOR VERIFYING AN AUTHENTICITY OF AN IDENTITY DOCUMENT AND EXTRACTING TEXTUAL INFORMATION THEREFROM

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57. This application claims the benefit of priority to Swedish Patent Application Number 1551523-2, filed on Nov. 23, 2015, and entitled "Method and Scanner for Verifying An Authenticity of an Identify Document and Extracting Textual Information There From," the entire contents of which are hereby incorporated by reference herein for all purposes. This application is related to the Swedish Patent Application Number 1551524-0, filed on Nov. 23, 2015, and entitled "A Method and A Scanner for Verifying an Authenticity of an Identity Document," the entire contents of which are hereby incorporated by reference herein for all purposes.

BACKGROUND

Field

The present disclosure generally relates to verifying of documents, and more particularly to verifying an authenticity of identity documents and extracting textual information from said identity document, for example, methods, systems, an analyze server and computer program products for verifying the authenticity of an identity document and extracting information there from.

Description of the Related Art

The use of automatic systems for extracting information from identity documents, such as driver licenses and passports is increasing as the technology for extracting information progresses. One popular way is to use bar code scanners and scan a barcode provided on the identity document. This of course requires that there is a barcode on the identity document. Before the evolvement of automatic systems all extraction of information was made manually by a person reading the information and, if applicable, entering it into a data system or a Point of Sale (POS) system. This is of course time consuming and there is also a risk that errors may occur when entering the information into the system. Thus, notwithstanding the risk of errors, there is also due to inefficiency a risk for building up queues at the POS system, when performing transactions in which an identity document needs to be presented for confirming the identity of the person performing a transaction. Current systems, such as the bar scanners and more advanced scanners with Optical Character Recognition (OCR) capability, focus on the identification process itself and are very expensive and/or complicated such as identity systems used at, for example, airports in the United States and the United Kingdom.

Thus, there is a need for a simple yet reliable method for efficiently verifying the authenticity of an identity document.

SUMMARY

It is in view of the above considerations and others that the various embodiments disclosed herein have been made.

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices and methods.

The following disclosure describes non-limiting examples of some embodiments. For instance, other embodiments of the disclosed systems and methods may or may not include the features described herein. Moreover, disclosed advantages and benefits can apply only to certain embodiments of the invention and should not be used to limit the disclosure.

It is a general object of the embodiments described herein to allow for an improved way of performing a transaction requiring an identity document to be presented for confirming the identity of the person performing the transaction. More specifically, a general object is to enable a simple and reliable verification of an authenticity of an identity document when performing such a transaction and at the same time provide the POS system with information from the identity document.

In a first of its aspects, a method for verifying an authenticity of an identity document and extracting information therefrom is described. The method is performed by a system comprising a scanner, an analyze server (or, analysis server) and a Point of Sale (POS) system. The method comprises detecting, with a camera in the scanner, presence of the identity document in a slot of the scanner. In response to detecting the presence, i.e. the presence of the identity document, three images of the identity document are acquired with the camera, when the identity document is illuminated with white light, ultraviolet (UV) light and infrared (IR) light, respectively. The method further comprises encrypting, in the scanner, each acquired image and sending from the scanner a first message comprising a request for verifying the authenticity of the identity document together with the encrypted images to the analyze server. The method further comprises receiving, in the analyze server, the first message comprising the request for verifying the authenticity of the identity document and the encrypted images, decrypting in the analyze server the received images and determines the authenticity of the identity document by means of authentication algorithms and the received images. The method further comprises, in the analyze server, extracting textual information from the identity document with the received images, generating an encrypted verification report including the textual information extracted from the identity document and sending a second message comprising the encrypted verification report including the textual information from the analyze server to the scanner. The method further comprises receiving and decrypting, in the scanner, the encrypted verification report including the textual information and sending from the scanner a first signal to an indicating device associated with the scanner, said first signal indicating the state of the authenticity of the identity document as specified in the received and decrypted verification report. The method further comprises sending, from the scanner, the received textual information to the POS system in response to verifying the identity document.

In some embodiments, the method further comprises sending, from the scanner, the encrypted images to a database server where the images are stored.

In some embodiments, the determination of the authenticity of the identity document further comprises retrieving information about the validity of the identity document from external databases, such as a driving license registry or a register of passports or retrieving information about the owner of the identity document from external databases, such as a credit reference register or an enforcement service register. The determination of the authenticity of the identity document may further comprise determining the type of identity document and retrieving corresponding templates to compare the received images with.

In a second of its aspects, a system for verifying an authenticity of an identity document and extracting information therefrom is described. The system comprises a scanner, an analyze server (i.e. analysis server), a Point of Sale (POS) system, and at least one processor and a memory comprising instructions stored thereon that when executed by the at least one processor cause the system to detect, with a camera in the scanner, presence of the identity document in a slot of the scanner. In response to the detection of presence (i.e., detection of presence of the identity document) the scanner is operative to acquire, with the camera, three images of the identity document when the identity document is illuminated with white light, UV light and IR light, respectively, encrypt each acquired image to generate encrypted images and send a first message comprising a request for verifying the authenticity of the identity document together with the encrypted images to the analyze server. The analyze server is operative to receive the first message comprising the request for verifying the authenticity of the identity document and the encrypted images, decrypt the received images, determine the authenticity of the identity document by means of authentication algorithms and the received images, extract textual information from the identity document by means of the received images, generate an encrypted verification report including textual information extracted from the identity document and send a second message comprising the encrypted verification report including the textual information to the scanner. The scanner is further operative to decrypt the encrypted verification report including the textual information, send a first signal to an indicating device associated with the scanner, said first signal indicating the state of the authenticity of the identity document as specified in the received and decrypted verification report and send the received textual information to the POS system in response to that the identity document has been verified.

In some embodiments, the memory comprising instructions stored thereon that when executed by the processor further cause the system to send, from the scanner, the encrypted images to a database server where the images are stored.

In some embodiments, the memory comprising instructions stored thereon that when executed by the processor further cause the system to retrieve information about the validity of the identity document from external databases, such as a driving license registry or a register of passports, when determining the authenticity of the identity document, and/or retrieve information about the owner of the identity document from external databases, such as a credit reference register or an enforcement service register, when determining the authenticity of the identity document. In some embodiments, the memory comprising instructions stored thereon that when executed by the processor further cause the system to determine the type of identity document and retrieve corresponding templates to compare the received images with when determining the authenticity of the identity document.

In a third of its aspects, a non-transitory computer readable medium (e.g. a computer program) is described, comprising instructions which, when executed on a processor causes the processor to carry out the method according to the first or second aspects mentioned above.

In a fourth of its aspects, descried is a carrier comprising the non-transitory computer readable medium according to the third aspect, wherein the carrier is one of an electronic signal, an optical signal, a radio signal, or a computer readable storage medium.

In a fifth of its aspects, a method for verifying an authenticity of an identity document and extracting textual information therefrom is described. The method is performed by an analyze server (or, analysis server) and comprises receiving, from a scanner, a first message comprising a request for verifying the authenticity of the identity document and at least three encrypted images. The images are acquired when the identity document is illuminated with white light, UV light and IR light, respectively. The method further comprises decrypting the received images, determining the authenticity of the identity document by means of authentication algorithms and the received images, extracting textual information from the identity document by means of the received images, converting the extracted textual information such that it is readable by a Point of Sale (POS) system, generating an encrypted verification report including the textual information extracted from the identity document and sending a second message comprising the encrypted verification report including the textual information to the scanner.

In some embodiments, the determination of the authenticity of the identity document may also comprise retrieving information about the validity of the identity document from external databases, such as a driving license registry or a register of passports or retrieving information about the owner of the identity document from other external databases, such as a credit reference register or an enforcement service register. The determination of the authenticity of the identity document may further comprise determining the type of identity document and retrieving corresponding templates to compare the received images with.

In a sixth of its aspects, this disclosure concerns an analyze server (or, analysis server) for verifying an authenticity of an identity document and extract information therefrom. The analyze server comprises a processor and a memory comprising instructions stored thereon that when executed by the processor cause the analyze server to receive, from a scanner, a first message comprising a request for verifying the authenticity of the identity document and at least three encrypted images, said images being acquired when the identity document is illuminated with white light, UV light and IR light, respectively, decrypt the received images, determine the authenticity of the identity document with one or more authentication algorithms and the received images, extract textual information from the identity document with the received images, convert said extracted textual information such that it is readable by a Point of Sale (POS) system, generate an encrypted verification report including the textual information extracted from the identity document, and send a second message comprising the encrypted verification report including the textual information to the scanner.

In some embodiments, the memory comprises instructions stored thereon that when executed by the processor further cause the analyze server to retrieve information about the validity of the identity document from external databases, such as a driving license registry or a register of passports, when determining the authenticity of the identity document, and/or to retrieve information about the owner of the identity document from other external databases, such as a credit reference register or an enforcement service register, when determining the authenticity of the identity document. In some embodiments, the memory comprises instructions stored thereon that when executed by the processor further cause the analyze server to determine the type of identity document and retrieve corresponding templates to compare the received images with when determining the authenticity of the identity document.

In a seventh of its aspects, this disclosure concerns a non-transitory computer readable medium (e.g. a computer program), comprising instructions stored thereon that when executed by a processor causes the processor to carry out the method according to the fifth aspect mentioned above.

In an eight of its aspects, a carrier comprising the non-transitory computer readable medium according to the seventh aspect is described, wherein the carrier is one of an electronic signal, an optical signal, a radio signal, or a computer readable storage medium.

Thus, by using the methods, system and analyze server according to this disclosure it will be possible to not only verify the authenticity of the identity document in a quick and reliable way, with a robust and simple to system, but also share the textual information, obtained by the scanner in the system and extracted at the analyze server, with the POS system. This will provide the POS system with error free textual information without having to involve any staff. This will be done simultaneously with the authentication of the identity document and thus there will be no loss in time when performing transactions that require that the identity document is to be presented for confirming the identity of the person performing the transaction. By using external databases the system information regarding the validity of the identity document may also be checked. This is very useful since fraudsters often use stolen identity documents, which are authentic but since they are stolen not valid anymore. The possibility with the system described in the present disclosure will be highly appreciated by the retail trade, which now in an easy way may prevent fraud.

BRIEF DESCRIPTION OF THE DRAWINGS

These and other aspects, features and advantages will be apparent and elucidated from the following description of various embodiments, reference being made to the accompanying drawings, in which.

DETAILED DESCRIPTION

The development will now be described more fully hereinafter. The development may, however, be embodied in many different forms and should not be construed as limited to the embodiments set forth herein; rather, these embodiments are provided by way of example so that this disclosure will be thorough and complete, and will fully convey the scope of the development to those persons skilled in the art. Like reference numbers refer to like elements or method steps throughout this description.

Figure 1:
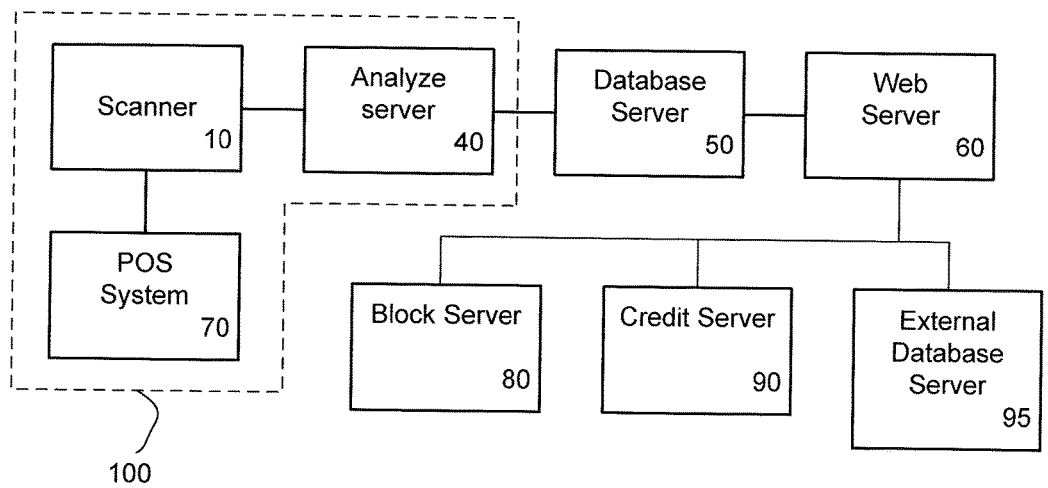
FIG. 1 schematically illustrates an exemplary environment where the system and the analyze server may be implemented, in accordance with some embodiments.
Figure 7:
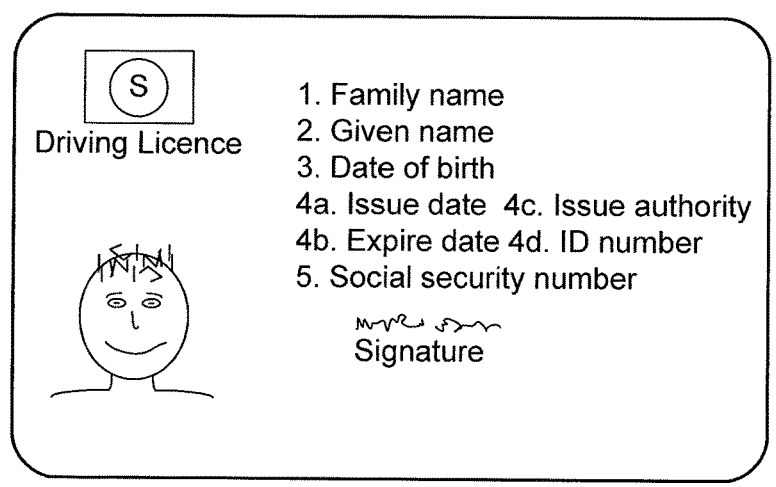
FIG. 7 shows an example embodiment of an identity document.

Turning now to FIG. 1, an exemplary environment of where the system and the analyze server may be implemented, in accordance with some embodiments, will be described. The system 100, shown with dashed lines, comprises a scanner 10, an analyze server 40 (a.k.a. analysis server) and a POS system 70. In this exemplary environment, the system is implemented in, for example, a store where customers might need to identify themselves when performing a transaction such as using their credit card for a purchase, picking up a parcel or signing a phone subscription. The system 100 is in an environment also comprising, a database server 50, a web server 60, a block server 80, a credit server 90 and an external database server 95. The system 100 is designed to protect transactions, such as credit purchases, parcel distribution or signing phone subscriptions. The scanner 10 of the system 100 is suitable for handling all transactions in which an identity document 32 (see, e.g., FIG. 7) is presented for confirming the identity of a person performing a transaction. When staff at a transaction point receives the identity document 32, it is put in the scanner 10. The scanner 10 is used to scan the identity document 32 in order to extract information therefrom. This may be done by acquiring images, as will be described in more detail in conjunction with FIG. 5 below. The images are encrypted by the scanner 10 and sent to the analyze server 40 for verifying that the identity document 32 is authentic. The analyze server 40 also performs other tasks such as performing OCR to extract textual information from the identity document 32. Such textual information may for example be, as shown in FIG. 7, family name, given name, date of birth, issue date, issue authority, expire date, identity number (ID) and social security number. In the exemplary embodiment of FIG. 7, the identity document is a Swedish driving license.

When verifying the authenticity of the identity document 32, the analyze server 40 might need to compare the acquired images with templates stored in different databases. Thus, the analyze server 40 may retrieve such information from the database server 50. The analyze server 40 may also retrieve information about the validity of the identity document 32 from the external database server 95, such as a driving license registry or a register of passports or from the block server 80 in which information about all blocked identity documents 32 may be stored. The thought behind the block server 80 is that a lost and/or a non-valid identity document 32 should not be able to be used in the system of the present disclosure after it has been blocked. A person who has blocked his identity document shall be protected from, for example, credit purchase or signing for subscriptions. A block server 80 may also be used to specify a maximum amount for credit purchases or in which geographical areas a credit purchase may be performed. The analyze server 40 may also retrieve information about the owner of the identity document 32 from the external database server 95, or the credit server 90. Such information may contain information from a credit reference register or an enforcement service register such that a credit analysis may be performed at the store which uses the system in the present disclosure. As is readily understood by a person skilled in the art, the analyze server 40 is configured to retrieve any information from external databases that may be helpful when performing a transaction at a store. The different database servers and other servers 50, 80, 90 and 95 may be updated with this type of information via the web server 60 connected to the different servers.

After verification, the analyze server 40 sends the result of the verification together with the textual information obtained by the OCR back to the scanner 10, which in turn sends the textual information to the POS system 70, such as a cash register in a store.

Figure 2:
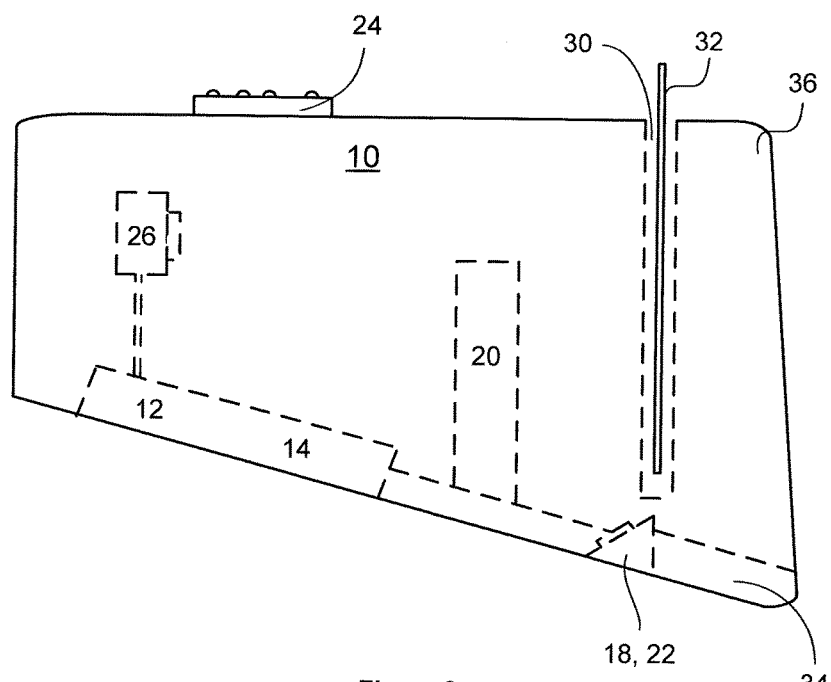
FIG. 2 is a side view of an example embodiment of a scanner in the system for verifying an authenticity of an identity document.
Figure 3:
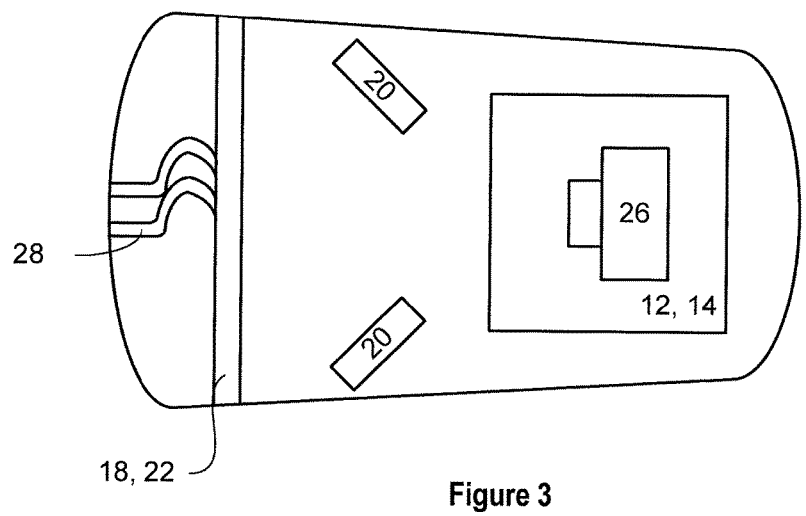
FIG. 3 is a view from above of an example embodiment of the scanner for verifying an authenticity of an identity document.
Figure 4:
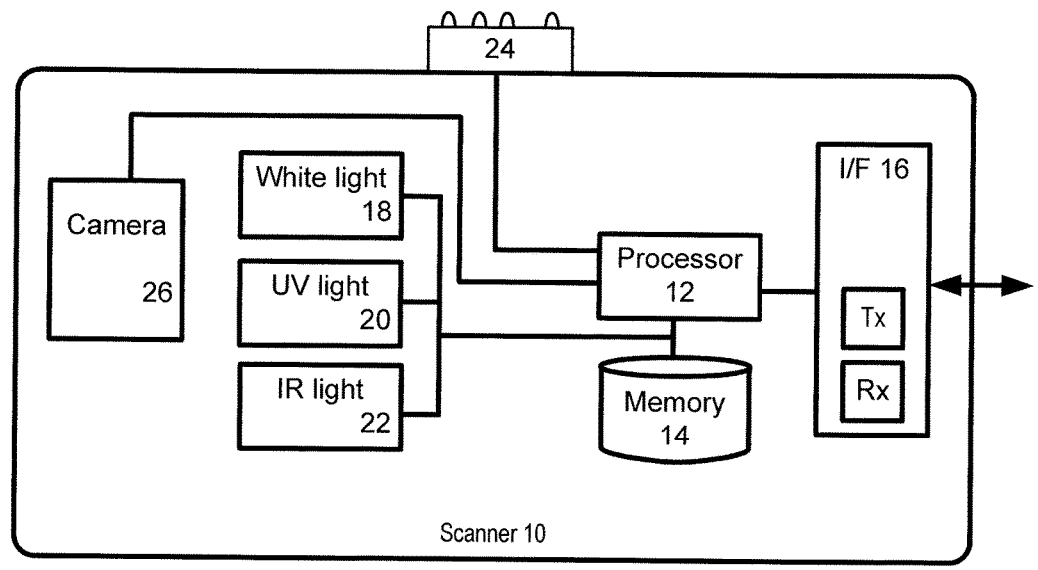
FIG. 4 functionally illustrates different components of the scanner.

Turning now to FIG. 2, FIG. 3 and FIG. 4, exemplary embodiments of the scanner 10 in the system 100 for verifying the authenticity of identity documents 32 and extracting textual information there from will be described closer. The scanner 10 is an important part of the system 100, the main tasks of which are to collect information to be analyzed by the analyze server 40, send it to the analyze server 40 and in return receive a verification report from the analyze server 40 together with the textual information to be distributed to the POS system 70. FIG. 2 shows a side view, FIG. 3 shows a view from above and FIG. 4 shows a functional view of the scanner 10. The scanner 10 comprises, a processor 12, a memory 14, an interface, I/F, 16, a white light source 18, an UV light source 20, an IR light source 22, indicating device 24, a camera 26, connection cables 28, a slot 30, a connection cable channel 34 and a casing 36. In FIG. 2, one can also see how the identity document 32 is inserted in the slot 30.

In the side view of FIG. 2, all components that are inside the casing 36 of the scanner 10 are shown with dashed lines. The slot 30 of the scanner 10 is provided with its entrance on top of the scanner 10. The slot 30 is adapted to receive different types of identity documents 32, such as driver licenses, passports etc. In the embodiment of FIG. 2, the identity documents 32 are to be inserted vertically into the slot 30 of the scanner 10. But as is readily understood by a person skilled in the art, the slot 30 may also be provided horizontally or have an inclination with reference to a vertical axis or a horizontal axis. The scanner 10 comprises three different light sources, one for white light 18, one for UV light 20 and one for IR light 22. In a preferred example embodiment the white light source 18 and the IR light source 22 are arranged in the bottom of the scanner 10 in the vicinity of the slot 30. The UV light source 22 is in the embodiment of FIG. 2 and FIG. 3 arranged as two light sources provided in the vicinity of the casing wall of the scanner 10, such that they do not obscure the field-of-view of the camera 26. It is to be understood that the light sources 18, 20 and 22 may be arranged in many different ways inside of the scanner casing 36. There are many different factors that affect the arrangement of the light sources 18, 20 and 22, such as: i) the shape of the scanner 10, ii) the arrangement of the slot 30, iii) the arrangement of the camera 26, etc. In the design, it is important not to obscure the field-of-view of the camera 26 and place the light sources 18, 20 and 22 such that they properly illuminate the identity document 32 when it is inserted in the slot 30. With properly it is meant such that the camera 26 has the right amount of light to acquire images. This means that the light sources 18, 20 and 22 may be bundled together and act as one light source or may be spread out inside the casing 36 such that they properly illuminate the identity document 32, all depending on the design of the scanner 10. The camera 26 may be any camera that is suitable for acquiring images with white light, IR light and UV light.

The scanner 10 may, as mentioned above, be provided with indicating device 24. The indicating device 24 may be lights that indicate the result of the verification of the authenticity of the identity document 32. Instead of indicating the result with lights it is also possible to use a sound generator as indicating device 24, using different sounds to indicate the result of the verification.

As is evident from FIG. 3, the scanner 10 is also provided with connection cables 28 for connecting the scanner 10 to a power supply and a network such that it may communicate with other devices such as the analyze server 40 and the POS system 70. In the view shown in FIG. 2, the cables are provided inside the connection cable channel 34.

Reference is now made to FIG. 4, which schematically illustrates an example implementation of an embodiment of the scanner 10 with functional blocks. The scanner 10 is configured to perform, or otherwise execute, together with the analyze server 40 and the POS system 70, the method which will be described in conjunction with FIG. 5. To this end, the scanner 10 comprises hardware resources as described earlier herein. For example, the scanner 10 may comprise the processor 12 and the memory 14. Also, a communications interface 16, or a communications circuitry, may be provided in order to allow the scanner 10 to communicate with other devices of the system such as the analyze server 40 and the POS system 70, e.g. via a network such as the Internet. To this end, the communications interface 16 may comprise a transmitter (Tx) and a receiver (Rx). Alternatively, the communications interface 16 may comprise a transceiver (Tx/Rx) combining both transmission and reception capabilities. The communications interface 16 may include a radio frequency (RF) interface allowing the scanner 10 to communicate with the analyze server 40 and the POS system 70 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera. The scanner 10 may also be connected to the analyze server 40 and the POS system 70 directly by wire.

Figure 5:
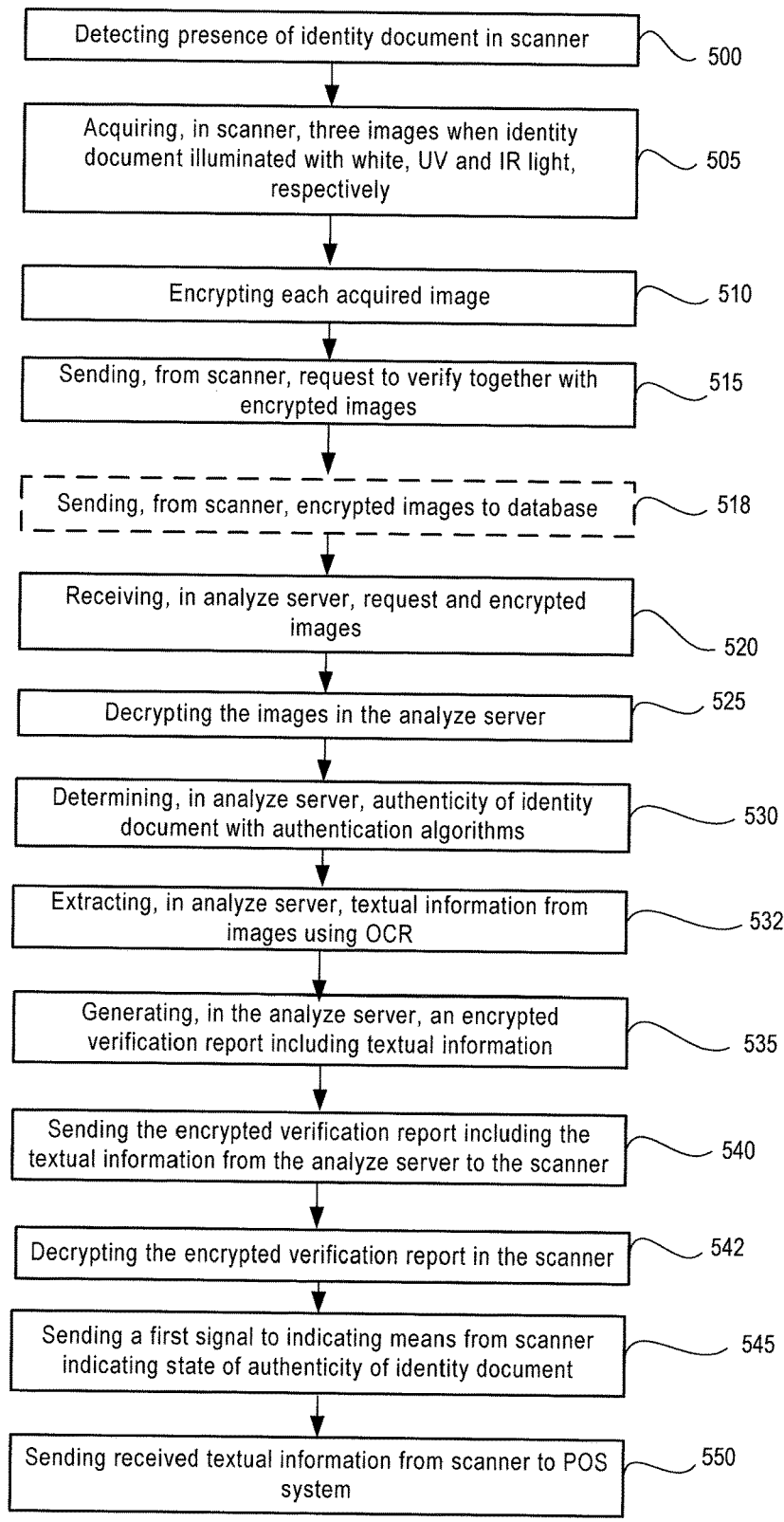
FIG. 5 schematically illustrates a flowchart of a method performed in the system in accordance with an embodiment.

In some implementations, the memory 14 stores computer program code, which, when run in the processor 12 causes the scanner 10 to perform a part of the method, for verifying the authenticity of the identity document and extract textual information, to be described in conjunction with FIG. 5.

Reference is now made to FIG. 5, which schematically illustrates a flowchart of the method, performed by the system 100, for verifying the authenticity of the identity document 32 and to extract textual information there from. As mentioned above, the staff will receive the identity document 32 from a customer who wishes to perform a transaction. The staff then puts the identity document 32 into the slot 30 of the scanner 10. Prior to that the identity document 32 is put into the slot of the scanner 10, the scanner is in a waiting mode. In the waiting mode the scanner 10 is ready to detect the presence of the identity document 32 in the slot 30. This is done by illuminating the slot 30 with white light from the light source for white light 18 and turning, e.g. bringing, the camera 26 into a filming mode. The images acquired when the camera 26 is in the filming mode are then compared with reference images in order to detect the presence of the identity document 32 in the slot 30 in step 500. When the presence of the identity document 32 has been detected the method progresses with step 505, in which three images of the identity document 32 is acquired by means of the camera 26, when the identity document 32 is illuminated with white light from the white light source 18, with UV light from the UV lights source 20 and with IR light from the IR lights source 22. Thus, three different images of the identity document are acquired with the camera 26 using white light, UV light and IR light. It should be understood that the images may be acquired in any order.

After acquiring the different images the scanner 10 encrypts each image to generate encrypted images in step 510. The scanner 10 then sends a first message to the analyze server 40, in step 515, comprising a request for verifying the authenticity of the identity document 32 together with the encrypted images. In a preferred embodiment the scanner 10 may also send, in step 518, the encrypted images to a database server 50 where the images are stored for later reference if needed. Such stored images may be helpful when trying to catch fraudsters and solve fraud crimes.

In step 520, the analyze server 40 receives the first message comprising the request for verifying the authenticity of the identity document 32 together with the encrypted images. The analyze server 40 decrypts, in step 525, the received images. After decryption of the images the analyze server 40 starts to analyze the received images. The analyzing of the images in different spectrums is performed with different authentication algorithms. There are a lot of different authentication algorithms on the market today, all of which may be used together with the method described in the present disclosure. In a preferred embodiment the authentication algorithm may start with the determining the type of identity document 32 and retrieve corresponding templates to compare the received images with. This may speed up the authentication process. Thus, in step 530, the analyze server 40 determines the authenticity of the identity document 32 by means of the authentication algorithms and the multi-spectral images. Step 530 may further comprise retrieving information about the validity or about the owner of the identity document 32 from any of the external databases servers or other servers as mentioned above in conjunction with FIG. 1. Such information may for example be information in registers such as the driving license registry, register of passports, credit reference registers or the enforcement service register. In step 532 the analyze server 40 extracts textual information from the identity document 32 by means of the received images and for example OCR or any other known method for extracting textual information from images acquired using white light, UV light or IR light or any combination thereof. The textual information may be any textual information obtainable from the identity document 32, such as family name, given name, date of birth, issue date, issue authority, expire date, identity number (ID) and social security number as shown in the exemplary identity document, in form of a Swedish driving license, in FIG. 7. When the analyze server 40 has determined the authenticity of the identity document 32 and extracted the textual information, the analyze server 40 generates, in step 535, a verification report including the textual information. This verification report is also encrypted by the analyze server 40 in step 535 before it is sent in a second message by the analyze server 40, in step 540, to the scanner 10. During the time the analyze server 40 performs the verification process and extraction of textual information the scanner 10 waits and listens for a response to the verifying request sent to the analyze server 40. This waiting time varies depending on the network load and other circumstances but may typically be one to three seconds.

The scanner 10 receives and decrypts, in step 542, the encrypted verification report including the textual information. The information in the verification report is then used by the scanner 10 to send, in step 545, a first signal to the indicating device 24. This first signal indicates the state of the authenticity of the identity document 32 as specified in the received verification report. In a preferred embodiment of the present invention the indicating device 24 may indicate three different states. In a first state, the first signal may indicate that the identity document 32 is authentic, in a second state, the first signal may indicate that the identity document 32 is unauthentic and in a third state, the first signal may further indicate that the identity document 32 is non-verifiable. This third state may be the case if there have been problems with acquiring the different images, e.g. malfunction of the camera 26 or any of the light sources 18, 20 and 22. It might also happen that the identity document 32 is unrecognizable, i.e. it is not possible to determine the type of identity document. The indicating device 24 may for example comprise three different colored lights, where a green light would indicate that the identity document 32 is authentic, a red light would indicate that the identity document is unauthentic and a yellow light would indicate the identity document is non-verifiable. However, the indicating device 24 may also be a sound generator generating different sounds depending on the different states mentioned above. For example an authentic identity document 32 may be signaled with three short tones, an unauthentic identity document 32 with one long tone and an unidentifiable identity document 32 with 3 long tones. It is readily understood by a person skilled in the art that there are many different ways to indicate three different states for the outcome of the verification of the identity document 32 and that the present invention is not limited to those examples given above. The indicating device 24 may further be used to indicate additional states such as that the verification process is in progress. This may be indicated by sending a second signal to the indicating device 24 in response to detecting the presence of the identity document 32 in the slot 30 of the scanner 10. This second signal may for example turn on a fourth light, e.g. a blue light indicating that the verification process is in progress. This fourth light will be on until one of the three other lights will be turned on as a response to the obtained verification result.

In step 550 the textual information received in the verification report will be sent to the POS system 70 in response to that the identity document 32 has been verified. As mentioned above the textual information present on the identity document 32 may for example be one or more of the following items: given name, family name, social security number, type of identity document, number of identity document, result of verification process and expire date of identity document. The sending of the textual information to the POS system will increase the speed with which a transaction may be performed at a store. Today the authenticity of an identity document is often verified manually by the staff in the store. This is almost an impossible task if you are not an expert. The textual information is also often extracted manually by reading the identity document 32 and entering the textual information into the POS system 70, which of course may lead to errors when the information is entered into the system. Some POS systems 70 have bar code readers to extract information from identity documents 32 provided with a bar code. This process speeds up the extraction of information from the identity document 32, but does not reveal if the identity document 32 is authentic or not.

Figure 6:
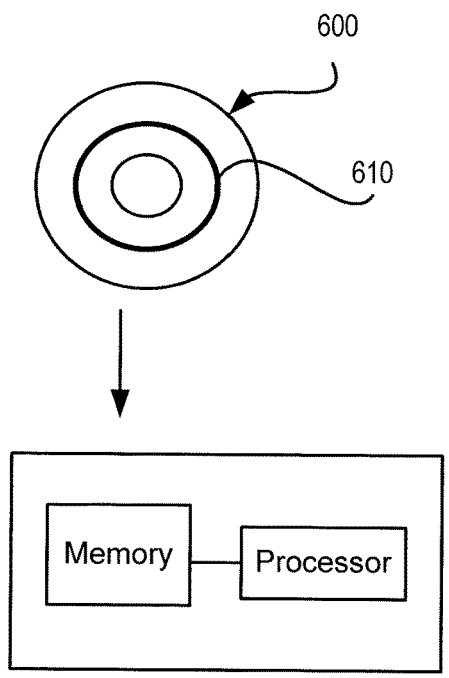
FIG. 6 illustrates a carrier comprising a computer program to be executed in the system, in accordance with an embodiment.

Turning now to FIG. 6, another embodiment will be briefly discussed. FIG. 6 shows an example of a computer-readable medium, in this example in the form of a data disc 600. In one embodiment the data disc 600 is a magnetic data storage disc. The data disc 600 is configured to carry instructions 610 that can be loaded into different memories 14, 914 in the system 100 comprising the scanner 10, the analyze server 40 and the POS system 70. In FIG. 6 the memories and processors are for sake of simplicity only shown as one memory and one processor even though they are distributed throughout the system 100. Upon execution of said instructions by the processors the system 100 is caused to execute the method or procedure according to any one of the embodiments described herein in conjunction with FIG. 5. The data disc 600 is arranged to be connected to or within and read by a reading device (not shown), for loading the instructions into the processors. One such example of a reading device in combination with one (or several) data disc(s) 600 is a hard drive. It should be noted that the computer-readable medium can also be other mediums such as compact discs, flash memories or other memory technologies commonly used. In such an embodiment the data disc 600 is one type of a tangible computer-readable medium. The instructions may alternatively be downloaded to a computer data reading device, such as the scanner 10, the analyze server 40 and the POS system 70 capable of reading computer coded data on a computer-readable medium, by comprising the instructions in a computer-readable signal (not shown) which is transmitted via a wireless (or wired) interface (for example via the Internet) to the computer data reading device for loading the instructions into processors of the system 10. In such an embodiment, the computer-readable signal is one type of a non-tangible computer-readable medium.

Figure 8:
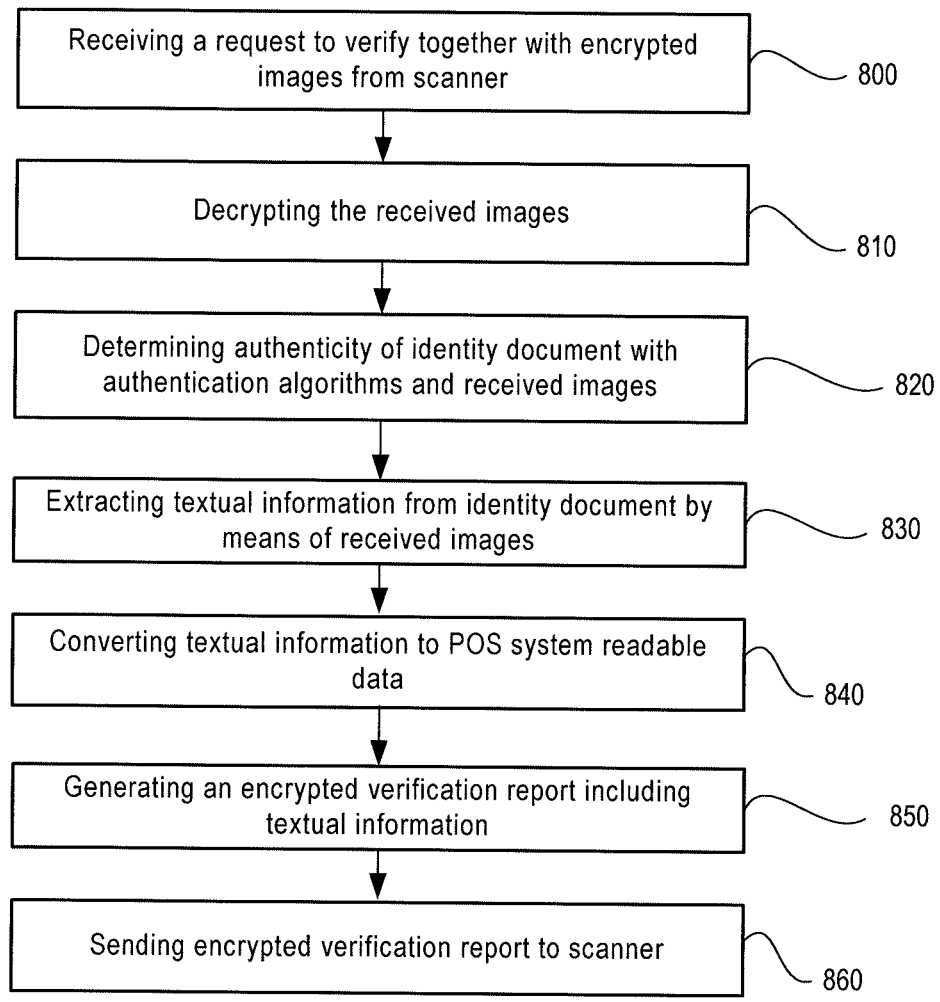
FIG. 8 schematically illustrates a flowchart of a method performed in the analyze server in accordance with an embodiment.

Turning now to FIG. 8, which schematically illustrates a flowchart of the method, performed by the analyze server 40, for verifying the authenticity of the identity document 32 and to extract textual information there from. The method starts in step 800, in which the analyze server 40 receives, from the scanner 10, a first message comprising a request for verifying the authenticity of the identity document 32. The request also comprises at least three encrypted images. The images have been acquired by the scanner 10 and a first image has been acquired when the identity document is illuminated with white light a second image has been acquired when the identity document is illuminated with UV light and a third image has been acquired when the identity document is illuminated with IR light. The received images, which have been encrypted in order to keep them secret for any potential eavesdropper when they are transferred from the scanner 10 to the analyze server 40, are decrypted in step 810, when they are received in the analyze server 40.

After decryption of the images the analyze server 40 starts to analyze the received images. The analyzing of the images in different spectrums is performed with different authentication algorithms. As mentioned above there are a lot of different authentication algorithms on the market today, all of which may be used together with the method described in the present disclosure. In a preferred embodiment the authentication algorithm may start with determining the type of identity document 32 and retrieve corresponding templates to compare the received images with. This may speed up the authentication process. Thus, in step 820, the analyze server 40 determines the authenticity of the identity document 32 by means of the authentication algorithms and the at least three images. Step 820 may further comprise retrieving information about the validity or about the owner of the identity document 32 from any of the external databases servers or other servers as mentioned above in conjunction with FIG. 1 and FIG. 5. Such information may for example be information in registers such as the driving license registry, register of passports, credit reference registers or the enforcement service register. In step 830 the analyze server 40 extracts textual information from the identity document 32 by means of the received images and for example OCR or any other known method for extracting textual information from images acquired using white light, UV light or IR light or any combination thereof. The textual information may be any textual information obtainable from the identity document 32 as already mentioned above and shown in FIG. 7. In step 840 the analyze server 40 will convert the textual information to data that is readable by the POS system 70. Thus by converting the textual information into POS system 70 readable data it will be easy to automatically transfer said textual information to the POS system 70 as described in conjunction with FIG. 5.

When the analyze server 40 has determined the authenticity of the identity document 32 and extracted and converted the textual information, the analyze server 40 generates, in step 850, a verification report including the converted textual information. This verification report is also encrypted by the analyze server 40 in step 850 before it is sent in a second message by the analyze server 40, in step 860, to the scanner 10.

Figure 9:
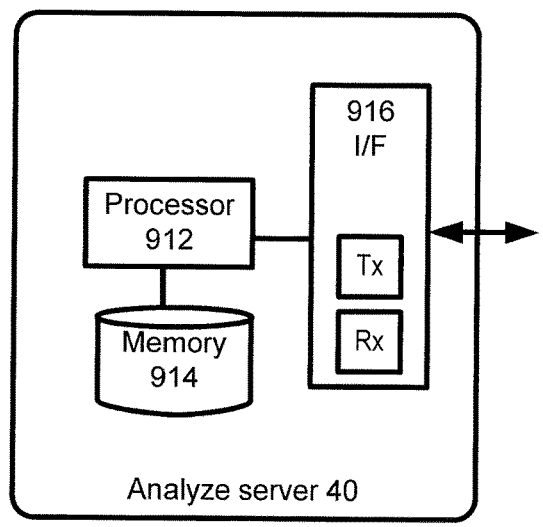
FIG. 9 functionally illustrates different components of an analyze server.

Turning now to FIG. 9 the analyze server 40 for verifying the authenticity of the identity document 32 and extract information therefrom will be described more in detail. FIG. 9 schematically illustrates an example implementation of an embodiment of the analyze server 40 with functional blocks. The analyze server 40 is configured to perform, or otherwise execute the method described in conjunction with FIG. 8. Thus, the analyze server 40 comprises a processor 912 and memory 914 comprising instructions executable by the processor 912 whereby the analyze server 40 is operative to receive, from the scanner 10, a first message comprising a request for verifying the authenticity of the identity document 32 and at least three encrypted images. The images have been acquired, by the scanner 10, when the identity document is illuminated with white light, UV light and IR light, respectively. The analyze server 40 is further operative to decrypt the received images, determine the authenticity of the identity document 32 by means of authentication algorithms and the received images, extract textual information from the identity document 32 by means of the received images, convert said extracted textual information such that it is readable by a Point of Sale (POS) system 70, generate an encrypted verification report including the textual information extracted from the identity document 32 and send a second message comprising the encrypted verification report including the textual information to the scanner 10.

The analyze server 40 further comprises a communications interface 916, or a communications circuitry, in order to allow the analyze server 40 to communicate with other devices such as the scanner 10 and database servers 50, external database servers 95, block servers 80 and credit servers 90, e.g. via a network such as the Internet. To this end, the communications interface 916 may comprise a transmitter (Tx) and a receiver (Rx). Alternatively, the communications interface 916 may comprise a transceiver (Tx/Rx) combining both transmission and reception capabilities. The communications interface 916 may include a radio frequency (RF) interface allowing the analyze server 40 to communicate with the scanner 10 and other servers 50, 80, 90 and 95 through a radio frequency band through the use of different radio frequency technologies such as LTE (Long Term Evolution), WCDMA (Wideband Code Division Multiple Access), any other cellular network standardized by the 3rd Generation Partnership Project (3GPP), or any other wireless technology such as Wi-Fi, Bluetooth®, etcetera.

In some implementations, the memory 914 stores computer program code, which, when run in the processor 912 causes the analyze server 40 to perform the method, for verifying the authenticity of the identity document and extract textual information, described in conjunction with FIG. 8.

Figure 10:
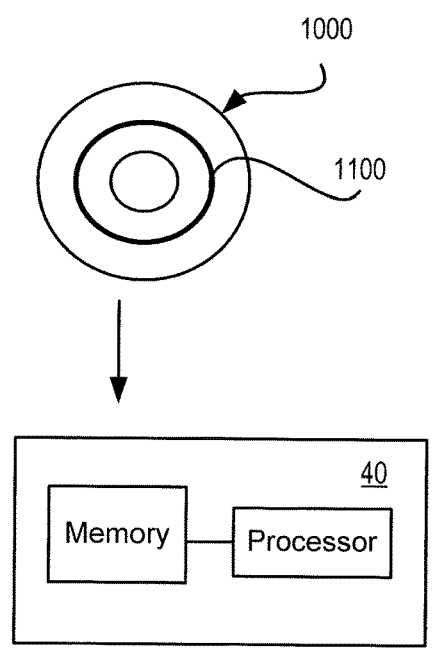
FIG. 10 illustrates a carrier comprising a computer program to be executed in the analyze server, in accordance with an embodiment.

Turning now to FIG. 10, another embodiment will be briefly discussed. FIG. 10 shows an example of a computer-readable medium, in this example in the form of a data disc 1000. In one embodiment the data disc 1000 is a magnetic data storage disc. The data disc 1000 is configured to carry instructions 1010 that can be loaded into the memory 914 of the analyze server 40. Upon execution of said instructions by the processor 912 the analyze server 40 is caused to execute the method or procedure according to any one of the embodiments described herein in conjunction with FIG. 8. The data disc 1000 is arranged to be connected to or within and read by a reading device (not shown), for loading the instructions into the processor. One such example of a reading device in combination with one (or several) data disc(s) 1000 is a hard drive. It should be noted that the computer-readable medium can also be other mediums such as compact discs, flash memories or other memory technologies commonly used. In such an embodiment the data disc 1000 is one type of a tangible computer-readable medium. The instructions may alternatively be downloaded to a computer data reading device, such as the analyze server 40 capable of reading computer coded data on a computer-readable medium, by comprising the instructions in a computer-readable signal (not shown) which is transmitted via a wireless (or wired) interface (for example via the Internet) to the computer data reading device for loading the instructions into a processor of the analyze server 40. In such an embodiment, the computer-readable signal is one type of a non-tangible computer-readable medium.

In the detailed description hereinabove, for purposes of explanation and not limitation, specific details are set forth in order to provide a thorough understanding of various embodiments described in this disclosure. In some instances, detailed descriptions of well-known devices, components, circuits, and methods have been omitted so as not to obscure the description of the embodiments disclosed herein with unnecessary detail. All statements herein reciting principles, aspects, and embodiments disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure. Thus, for example, it will be appreciated that block diagrams herein can represent conceptual views of illustrative circuitry or other functional units embodying the principles of the described embodiments. Similarly, it will be appreciated that any flow charts and the like represent various processes which may be substantially represented in computer readable medium and so executed by a computer or processor, whether or not such computer or processor is explicitly shown. The functions of the various elements including functional blocks may be provided through the use of hardware such as circuit hardware and/or hardware capable of executing software in the form of coded instructions stored on the above-mentioned computer readable medium. Thus, such functions and illustrated functional blocks are to be understood as being either hardware-implemented and/or computer-implemented, and thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions. In terms of computer implementation, a computer is generally understood to comprise one or more processors or one or more controllers. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" may also be construed to refer to other hardware capable of performing such functions and/or executing software, such as the example hardware recited above.

Selected Example Embodiments

The technology described in this disclosure thus encompasses without limitation the following Numbered Example Embodiments (NEE's):

NEE 1. A method for verifying an authenticity of an identity document (32) and extracting information therefrom, said method being performed by a system comprising a scanner (10), an analyze server (40) and a Point of Sale (POS) system (70), said method comprising:

detecting (500), by means of a camera (26) in the scanner (10), presence of the identity document (32) in a slot (30) of the scanner (10), acquiring (505), by means of the camera (26), three images of the identity document (32) when the identity document (32) is illuminated with white light, UV light and IR light, respectively, encrypting (510), in the scanner (10), each acquired image to generate encrypted images, sending (515), from the scanner (10), a first message comprising a request for verifying the authenticity of the identity document (32) together with the encrypted images to the analyze server (40), receiving (520), in the analyze server (40), the first message comprising the request for verifying the authenticity of the identity document (32) and the encrypted images, decrypting (525), in the analyze server (40), the received images, determining (530), in the analyze server (40), the authenticity of the identity document (32) by means of authentication algorithms and the received images, extracting (532), in the analyze server (40), textual information from the identity document (32) by means of the received images,
generating (535), in the analyze server (40), an encrypted verification report including the textual information extracted from the identity document (32),
sending (540), from the analyze server (40), a second message comprising the encrypted verification report including the textual information to the scanner (10),
decrypting (542), in the scanner (10), the encrypted verification report including the textual information,
sending (545), from the scanner (10), a first signal to an indicating device (24) associated with the scanner (10), said first signal indicating the state of the authenticity of the identity document (32) as specified in the received and decrypted verification report, and
sending (550), from the scanner (10), the received textual information to the POS system (70) in response to that the identity document (32) has been verified.

NEE 2. The method according to NEE 1, further comprising:
sending (518), from the scanner (10), the encrypted images to a database server (50) where the images are stored.

NEE 3. The method according to NEE 1 or NEE 2, wherein determining (530) the authenticity of the identity document (32) further comprises retrieving information about the validity of the identity document (32) from external databases (50; 80; 95), such as a driving license registry or a register of passports.

NEE 4. The method according to any of NEEs 1 to 3, wherein determining (530) the authenticity of the identity document (32) further comprises retrieving information about the owner of the identity document (32) from external databases (90), such as a credit reference register or an enforcement service register.

NEE 5. The method according to any of NEEs 1 to 4, wherein determining (530) the authenticity of the identity document (32) further comprises determining the type of identity document (32) and retrieving corresponding templates to compare the received images with.

NEE 6. A system for verifying an authenticity of an identity document (32) and extracting information there from, the system comprising a scanner (10), an analyze server (40), a Point of Sale (POS) system (70), at least one processor (12; 912) and memory (14; 914) comprising instructions executable by the processor (12; 912) whereby the system is operative to:
detect, by means of a camera (26) in the scanner (10), presence of the identity document (32) in a slot (30) of the scanner (10),
acquire, by means of the camera (26), three images of the identity document (32) when it is illuminated with white light, UV light and IR light, respectively,
encrypt, in the scanner (10), each acquired image to generate encrypted images,
send, from the scanner (10), a first message comprising a request for verifying the authenticity of the identity document (32) together with the encrypted images to the analyze server (40),
receive, in the analyze server (40), the first message comprising the request for verifying the authenticity of the identity document (32) and the encrypted images,
decrypt, in the analyze server (40), the received images,
determine, in the analyze server (40), the authenticity of the identity document (32) by means of authentication algorithms and the received images,
extract, in the analyze server (40), textual information from the identity document (32) by means of the received images,
generate, in the analyze server (40), an encrypted verification report including textual information extracted from the identity document (32),
send, from the analyze server (40), a second message comprising the encrypted verification report including the textual information to the scanner (10),
decrypt, in the scanner (10), the encrypted verification report including the textual information,
send, from the scanner (10), a first signal to an indicating device (24) associated with the scanner (10), said first signal indicating the state of the authenticity of the identity document (32) as specified in the received and decrypted verification report, and
send, from the scanner (10), the received textual information to the POS system (70) in response to that the identity document (32) has been verified.

NEE 7. The system according to NEE 6, wherein the system is further operative to:
send, from the scanner (10), the encrypted images to a database server (50) where the images are stored.

NEE 8. The system according to NEE 6 or NEE 7, wherein the system is further operative to:
retrieve information about the validity of the identity document (32) from external databases (50; 80; 95), such as a driving license registry or a register of passports when determining the authenticity of the identity document (32).

NEE 9. The system according to any of NEE's 6 or 8, wherein the system is further operative to:
retrieve information about the owner of the identity document (32) from external databases (90), such as a credit reference register or an enforcement service register when determining the authenticity of the identity document (32).

NEE 10. The system according to any of NEE's 6 to 9, wherein the system is further operative to:
determine the type of identity document (32) and retrieve corresponding templates to compare the received images with when determining the authenticity of the identity document (32).

NEE 11. A computer program, comprising instructions which, when executed on at least one processor causes the processor(s) to carry out the method according to any one of NEE's 1 to 5.

NEE 12. A carrier comprising the computer program according to NEE 11, wherein the carrier is one of an electronic signal, an optical signal, a radio signal, or a computer readable storage medium.

NEE 13. A method for verifying an authenticity of an identity document (32) and extracting textual information there from, said method being performed by an analyze server (40), said method comprising:
receiving (800), from a scanner (10), a first message comprising a request for verifying the authenticity of the identity document (32) and at least three encrypted images, said images being acquired when the identity document is illuminated with white light, UV light and IR light, respectively,
decrypting (810) the received images,
determining (820) the authenticity of the identity document (32) by means of authentication algorithms and the received images,
extracting (830) textual information from the identity document (32) by means of the received images, converting (840) said extracted textual information such that it is readable by a Point of Sale (POS) system (70), generating (850) an encrypted verification report including the textual information extracted from the identity document (32), sending (860) a second message comprising the encrypted verification report including the textual information to the scanner (10).

NEE 14. The method according to NEE 13, wherein determining (820) the authenticity of the identity document (32) further comprises retrieving information about the validity of the identity document (32) from external databases (50; 80; 95), such as a driving license registry or a register of passports.

NEE 15. The method according to NEE 13 or NEE 14, wherein determining (820) the authenticity of the identity document (32) further comprises retrieving information about the owner of the identity document (32) from external databases (90), such as a credit reference register or an enforcement service register.

NEE 16. The method according to any of NEE's 13 to 15, wherein determining (820) the authenticity of the identity document (32) further comprises determining the type of identity document (32) and retrieving corresponding templates to compare the received images with.

NEE 17. An analyze server (40) for verifying an authenticity of an identity document (32) and extract information there from, the analyze server (40) comprising a processor (912) and memory (914) comprising instructions executable by the processor (912) whereby the analyze server (40) is operative to:

receive, from a scanner (10), a first message comprising a request for verifying the authenticity of the identity document (32) and at least three encrypted images, said images being acquired when the identity document is illuminated with white light, UV light and IR light, respectively, decrypt the received images, determine the authenticity of the identity document (32) by means of authentication algorithms and the received images, extract textual information from the identity document (32) by means of the received images, convert said extracted textual information such that it is readable by a Point of Sale (POS) system (70), generate an encrypted verification report including the textual information extracted from the identity document (32), send a second message comprising the encrypted verification report including the textual information to the scanner (10).

NEE 18. The analyze server (40) according to NEE 17, wherein the analyze server (40) is further operative to:

retrieve information about the validity of the identity document (32) from external databases (50; 80; 95), such as a driving license registry or a register of passports when determining the authenticity of the identity document (32).

NEE 19. The analyze server (40) according to NEE 17 or NEE 18, wherein the analyze server (40) is further operative to:

retrieve information about the owner of the identity document (32) from external databases (90), such as a credit reference register or an enforcement service register when determining the authenticity of the identity document (32).

NEE 20. The analyze server (40) according to any of NEE's 17 to 19, wherein the analyze server (40) is further operative to:

determine the type of identity document (32) and retrieve corresponding templates to compare the received images with when determining the authenticity of the identity document (32).

NEE 21. A computer program, comprising instructions which, when executed on a processor causes the processor to carry out the method according to any one of NEE's 13 to 16.

NEE 22. A carrier comprising the computer program according to NEE 21, wherein the carrier is one of an electronic signal, an optical signal, a radio signal, or a computer readable storage medium.

Modifications and other variants of the described embodiments will come to mind to one skilled in the art having benefit of the teachings presented in the foregoing description and associated drawings. Therefore, it is to be understood that the embodiments are not limited to the specific example embodiments described in this disclosure and that modifications and other variants are intended to be included within the scope of this disclosure. Still further, although specific terms may be employed herein, they are used in a generic and descriptive sense only and not for purposes of limitation. Therefore, a person skilled in the art would recognize numerous variations to the described embodiments that would still fall within the scope of the appended claims. As used herein, the terms "comprise/comprises" or "include/includes" do not exclude the presence of other elements or steps. Furthermore, although individual features may be included in different claims, these may possibly advantageously be combined, and the inclusion of different claims does not imply that a combination of features is not feasible and/or advantageous. In addition, singular references do not exclude a plurality A person/one having ordinary skill in the art would understand that information and signals can be represented using any of a variety of different technologies and techniques. For example, data, instructions, commands, information, signals, bits, symbols, and chips that can be referenced throughout the above description can be represented by voltages, currents, electromagnetic waves, magnetic fields or particles, optical fields or particles, or any combination thereof. A person/one having ordinary skill in the art would further appreciate that any of the various illustrative logical blocks, modules, controllers, means, circuits, and algorithm steps or blocks described in connection with the aspects disclosed herein can be implemented as electronic hardware (e.g., a digital implementation, an analog implementation, or a combination of the two, which can be designed using source coding or some other technique), various forms of program or design code incorporating instructions (which can be referred to herein, for convenience, as "software" or a "software module"), or combinations of both. To clearly illustrate this interchangeability of hardware and software, various illustrative components, blocks, modules, circuits, and steps or blocks have been described above generally in terms of their functionality. Whether such functionality is implemented as hardware or software depends upon the particular application and design constraints imposed on the overall system. Skilled artisans can implement the described functionality in varying ways for each particular application, but such implementation decisions should not be interpreted as causing a departure from the scope of the present disclosure.

The various illustrative logical blocks, modules, and circuits described in connection with the aspects disclosed herein and in connection with the figures can be implemented within or performed by an integrated circuit (IC), an access terminal, or an access point. The IC can include a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and can execute codes or instructions that reside within the IC, outside of the IC, or both. The logical blocks, modules, and circuits can include antennas and/or transceivers to communicate with various components within the network or within the device. A general purpose processor can be a microprocessor, but in the alternative, the processor can be any conventional processor, controller, microcontroller, or state machine. A processor can also be implemented as a combination of computing devices, e.g., a combination of a DSP and a microprocessor, a plurality of microprocessors, one or more microprocessors in conjunction with a DSP core, or any other such configuration. The functionality of the modules can be implemented in some other manner as taught herein. The functionality described herein (e.g., with regard to one or more of the accompanying figures) can correspond in some aspects to similarly designated "means for" functionality in the appended claims.

If implemented in software, the functions can be stored on or transmitted over as one or more instructions or code on a computer-readable medium. The steps or blocks of a method or algorithm disclosed herein can be implemented in a processor-executable software module which can reside on a computer-readable medium. Computer-readable media includes both computer storage media and communication media including any medium that can be enabled to transfer a computer program from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm can reside as one or any combination or set of codes and instructions on a machine readable medium and computer-readable medium, which can be incorporated into a computer program product.

It is understood that any specific order or hierarchy of steps or blocks in any disclosed process is an example of a sample approach. Based upon design preferences, it is understood that the specific order or hierarchy of steps or blocks in the processes can be rearranged while remaining within the scope of the present disclosure. Any accompanying method claims present elements of the various steps or blocks in a sample order, and are not meant to be limited to the specific order or hierarchy presented.

Various modifications to the implementations described in this disclosure can be readily apparent to those skilled in the art, and the generic principles defined herein can be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "example" is used exclusively herein to mean "serving as an example, instance, or illustration." Any implementation described herein as "example" is not necessarily to be construed as preferred or advantageous over other implementations.

Certain features that are described in this specification in the context of separate implementations also can be implemented in combination in a single implementation. Conversely, various features that are described in the context of a single implementation also can be implemented in multiple implementations separately or in any suitable sub-combination. Moreover, although features can be described above as acting in certain combinations and even initially claimed as such, one or more features from a claimed combination can in some cases be excised from the combination, and the claimed combination can be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing can be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

What is claimed is:

1. A method for verifying an authenticity of an identity document and extracting information therefrom, said method being performed by a system comprising a scanner, an analyze server and a Point of Sale (POS) system, said method comprising:
   detecting, with a camera in the scanner, presence of the identity document in a slot of the scanner, the scanner comprising:
      a first light source on a bottom of the scanner configured to generate white light,
      a second light source on a sidewall of the scanner configured to generate ultraviolet (UV) light,
      a third light source on the bottom of the scanner configured to generate infrared (IR) light, and
      an indicating device located on the scanner and comprising a first light having a first color to indicate the identity document is authentic, a second light having a second color different from the first color to indicate the identity document is unauthentic and a third light having a third color different from the first and second colors to indicate the identity document is non-verifiable,
   illuminating the identity document with white light from the first light source, with UV light from the second light source, and with IR light from the third light source,
   acquiring, with the camera, three images of the identity document when the identity document is illuminated with white light, ultraviolet (UV) light and infrared (IR) light, respectively,
   encrypting, in the scanner, each acquired image to generate encrypted images,
   sending, from the scanner, a first message comprising a request for verifying the authenticity of the identity document together with the encrypted images to the analyze server,
   receiving, in the analyze server, the first message comprising the request for verifying the authenticity of the identity document and the encrypted images,
   decrypting, in the analyze server, the received images,
   determining, in the analyze server, the authenticity of the identity document by use of authentication algorithms as applied to the decrypted received images,
   extracting, in the analyze server, textual information from the identity document with the decrypted received images,
   generating, in the analyze server, an encrypted verification report including the textual information extracted from the identity document,
   sending, from the analyze server, a second message comprising the encrypted verification report including the textual information to the scanner,
   decrypting, in the scanner, the encrypted verification report including the textual information,
   sending, from the scanner, a first signal to the indicating device on the scanner, said first signal indicating a state of the authenticity of the identity document as specified in the received and decrypted verification report, and
   sending, from the scanner, the received textual information to the POS system in response to verifying the identity document.

2. The method of claim 1, further comprising:
   sending, from the scanner, the encrypted images to a database server where the images are stored.

3. The method of claim 1, wherein determining the authenticity of the identity document further comprises retrieving information about the validity of the identity document from one or more external databases, the one or more external databases comprising a driving license registry or a register of passports.

4. The method of claim 1, wherein determining the authenticity of the identity document further comprises retrieving information about the owner of the identity document from one or more external databases, the one or more external databases comprising a credit reference register or an enforcement service register.

5. The method of claim 1, wherein determining the authenticity of the identity document further comprises determining the type of identity document and retrieving corresponding templates to compare the received images with.

6. A system for verifying an authenticity of an identity document and extracting information there from, the system comprising:
   a scanner comprising:
      a first light source on a bottom of the scanner configured to generate white light,
      a second light source on a sidewall of the scanner configured to generate ultraviolet (UV) light,
      a third light source on the bottom of the scanner configured to generate infrared (IR) light, and
      an indicating device located on the scanner and comprising a first light having a first color to indicate the identity document is authentic, a second light having a second color different from the first color to indicate the identity document is unauthentic and a third light having a third color different from the first and second colors to indicate the identity document is non-verifiable;
   an analyze server;
   a Point of Sale (POS) system; and
   at least one processor and a memory comprising instructions stored thereon that when executed by the at least one processor cause the system to:
      detect, with a camera in the scanner, presence of the identity document in a slot of the scanner, acquire, with the camera, three images of the identity document when it is illuminated with white light, ultraviolet (UV) light and infrared (IR) light, respectively, encrypt, in the scanner, each acquired image to generate encrypted images, send, from the scanner, a first message comprising a request for verifying the authenticity of the identity document together with the encrypted images to the analyze server, receive, in the analyze server, the first message comprising the request for verifying the authenticity of the identity document and the encrypted images, decrypt, in the analyze server, the received images, determine, in the analyze server, the authenticity of the identity document by use of authentication algorithms as applied to the decrypted received images, extract, in the analyze server, textual information from the identity document based on analysis of the decrypted received images, generate, in the analyze server, an encrypted verification report including the textual information extracted from the identity document, send, from the analyze server, a second message comprising the encrypted verification report including the textual information to the scanner, decrypt, in the scanner, the encrypted verification report including the textual information, send, from the scanner, a first signal to the indicating device on the scanner, said first signal indicating a state of the authenticity of the identity document as specified in the received and decrypted verification report, and send, from the scanner, the received textual information to the POS system in response to that the identity document has been verified.

7. The system of claim 6, the memory comprising instructions stored thereon that when executed by the at least one processor further cause the system to send, from the scanner, the encrypted images to a database server where the images are stored.

8. The system of claim 6, the memory comprising instructions stored thereon that when executed by the at least one processor further cause the system to retrieve information about the validity of the identity document from one or more external databases when determining the authenticity of the identity document.

9. The system of claim 6, the memory comprising instructions stored thereon that when executed by the at least one processor further cause the system to retrieve information about the owner of the identity document from one or more external databases when determining the authenticity of the identity document.

10. The system of claim 6, the memory comprising instructions stored thereon that when executed by the at least one processor further cause the system to determine the type of identity document and retrieve corresponding templates to compare the received images with when determining the authenticity of the identity document.

11. A method for verifying an authenticity of an identity document and extracting textual information there from, said method being performed by an analyze server, said method comprising:

receiving, from a scanner, a first message comprising a request for verifying the authenticity of the identity document and at least three encrypted images, said images being acquired when the identity document is illuminated with white light, ultraviolet (UV) light and infrared (IR) light, respectively, the scanner comprising:

a first light source on a bottom of the scanner configured to generate the white light, a second light source on a sidewall of the scanner configured to generate the ultraviolet (UV) light, a third light source on the bottom of the scanner configured to generate the infrared (IR) light, and an indicating device located on the scanner and comprising a first light having a first color to indicate the identity document is authentic, a second light having a second color different from the first color to indicate the identity document is unauthentic and a third light having a third color different from the first and second colors to indicate the identity document is non-verifiable, decrypting the received images, determining the authenticity of the identity document by use of authentication algorithms as applied to the decrypted received images, extracting textual information from the identity document based on analysis of the decrypted received images, converting said extracted textual information such that it is readable by a Point of Sale (POS) system, generating an encrypted verification report including the textual information extracted from the identity document, and sending a second message comprising the encrypted verification report including the textual information to the scanner.

12. The method of claim 11, wherein determining the authenticity of the identity document further comprises retrieving information about the validity of the identity document from one or more external databases, the one or more external databases comprising a driving license registry or a register of passports.

13. The method of claim 11, wherein determining the authenticity of the identity document further comprises retrieving information about the owner of the identity document from one or more external databases, the one or more external databases comprising a credit reference register or an enforcement service register.

14. The method of claim 11, wherein determining the authenticity of the identity document further comprises determining the type of identity document and retrieving corresponding templates to compare the received images with.

15. An analyze server for verifying an authenticity of an identity document and extract information there from, the analyze server comprising a processor and memory comprising instructions stored thereon that when executed by the processor cause the analyze server to:

receive, from a scanner, a first message comprising a request for verifying the authenticity of the identity document and at least three encrypted images, said images being acquired when the identity document is illuminated with white light, ultraviolet (UV) light and infrared (IR) light, respectively, the scanner comprising:

a first light source on a bottom of the scanner configured to generate the white light, a second light source on a sidewall of the scanner configured to generate the ultraviolet (UV) light, a third light source on the bottom of the scanner configured to generate the infrared (IR) light, and an indicating device located on the scanner and comprising a first light having a first color to indicate the identity document is authentic, a second light having a second color different from the first color to indicate the identity document is unauthentic and a third light having a third color different from the first and second colors to indicate the identity document is non-verifiable, decrypt the received images, determine the authenticity of the identity document with one or more authentication algorithms as applied to the decrypted received images, extract textual information from the identity document with the decrypted received images, convert said extracted textual information such that it is readable by a Point of Sale (POS) system, generate an encrypted verification report including the textual information extracted from the identity document, and send a second message comprising the encrypted verification report including the textual information to the scanner.

16. The analyze server of claim 15, the memory comprising instructions stored thereon that when executed by the processor further cause the analyze server to retrieve information about the validity of the identity document from external databases when determining the authenticity of the identity document.

17. The analyze server of claim 15, the memory comprising instructions stored thereon that when executed by the processor further cause the analyze server to retrieve information about the owner of the identity document from external databases when determining the authenticity of the identity document.

18. The analyze server of claim 15, the memory comprising instructions stored thereon that when executed by the processor further cause the analyze server to determine the type of identity document and retrieve corresponding templates to compare the received images with when determining the authenticity of the identity document.

* * * * *